(12) United States Patent
Conde (10) Patent No.: US 11,892,378 B2
(45) Date of Patent: Feb. 6, 2024

(54) STRETCHABLE BIDIRECTIONAL CAPACITIVE PRESSURE SENSOR AND METHOD OF USE

(71) Applicant: HYVE DYNAMICS HOLDINGS LIMITED, London (GB)

(72) Inventor: Juan Sebastian Tobon Conde, Leicester (GB)

(73) Assignee: HYVE DYNAMICS HOLDINGS LIMITED, London (GB)

( * ) Notice: Subject to any disclaimer, the term of this patent is extended or adjusted under 35 U.S.C. 154(b) by 106 days.

(21) Appl. No.: 17/310,413

(22) PCT Filed: Jan. 30, 2020

(86) PCT No.: PCT/GB2020/050214
§ 371 (c)(1),
(2) Date: Jul. 30, 2021

(87) PCT Pub. No.: WO2020/157504
PCT Pub. Date: Aug. 6, 2020

(65) Prior Publication Data
US 2022/0090982 A1 Mar. 24, 2022

(30) Foreign Application Priority Data
Jan. 30, 2019 (GB) .................................... 1901260

(51) Int. Cl.
*G01M 9/04* (2006.01)
*G01P 5/00* (2006.01)
(52) U.S. Cl.
CPC ................ *G01M 9/04* (2013.01); *G01P 5/00* (2013.01)

(58) Field of Classification Search
CPC ... G01L 9/0073; G01L 9/0072; G01L 9/0075; G01L 9/0042; G01L 9/12; G01L 9/125;
(Continued)

(56) References Cited

U.S. PATENT DOCUMENTS 7,958,789 B2 * 6/2011 Hayakawa ............... G01B 7/22
73/862.626
10,718,676 B2 * 7/2020 Chen ..................... H10N 70/826
(Continued)

FOREIGN PATENT DOCUMENTS

CN 109564137 B * 1/2021 ............. A43B 17/00
CN 112033582 B * 2/2022 ............. G01L 1/142
(Continued)

*Primary Examiner* — Andre J Allen
(74) *Attorney, Agent, or Firm* — Reches Patents (57) ABSTRACT

A sensing device for measuring pressure, more particularly, a stretchable bidirectional capacitive pressure sensor 20 is disclosed. The sensor comprises a first elastomeric sheet 22 with a series of conductor lines 221 located on or in the first elastomeric sheet, a second elastomeric sheet 28 with a series of conductor lines 261 located on or in the second elastomeric sheet; and a microstructure comprising a plurality of elastomeric pillars 241 disposed between the elastomeric sheets; wherein the The microstructure is bonded to both the first and second elastomeric sheets to allow the bidirectional sensor to register positive and negative pressure by the movement of the first and second elastomeric sheets. A further aspect of the invention discloses a method of collecting data related to fluid flow over an object by using a two-dimensional capacitive pressure sensor.

18 Claims, 5 Drawing Sheets

(58) Field of Classification Search
CPC ....... G01L 1/146; G01L 1/142; G01L 13/025; G01L 19/04; G01L 19/0092; G01L 15/00; G01L 19/147; G01L 1/148; G01L 19/0084; G01L 1/205; G01L 9/0045; G01L 27/007; G01L 1/14; G01L 9/0047; G01L 1/144; G01L 19/02; G01L 9/0054; G01L 1/18; G01L 19/0636; G01L 19/0645; G01L 19/14; G01L 19/148; G01L 27/002; G01L 9/0055; G01L 19/086; G01L 19/0618; G01L 9/0052; G01L 27/005; G01L 1/16; G01L 19/143; G01L 19/0007; G01L 9/0044; G01L 9/0048; G01L 9/0005; G01L 1/20; G01L 19/0038; G01L 9/008; G01L 5/228; G01L 19/06; G01L 9/0086; G01L 19/0681; G01L 19/0069; G01L 19/142; G01L 9/06; G01L 19/0627; G01L 9/0051; G01L 9/065; G01L 19/0061; G01L 19/141; G01L 19/0023; G01L 19/0654; G01L 1/2287; G01L 19/069; G01L 19/083; G01L 1/22; G01L 1/26; G01L 9/00; G01L 13/00; G01L 13/026; G01L 17/00; G01L 9/08; G01L 19/0046; G01L 9/0041; G01L 9/007; G01L 19/12; G01L 9/003; G01L 19/003; G01L 19/0076; G01L 25/00; G01L 19/149; G01L 9/045; G01L 1/2206; G01L 19/146; G01L 5/226; G01L 19/0609; G01L 7/08; G01L 19/00; G01L 19/0672; G01L 9/005; G01L 9/0095; G01L 9/0016; G01L 9/0098; G01L 9/04; G01L 1/005; G01L 13/02; G01L 9/0019; G01L 1/00; G01L 1/125; G01L 11/02; G01L 21/12; G01L 23/10; G01L 7/102; G01L 5/00; G01L 9/0025; G01L 9/0092; G01L 9/006; G01L 1/12; G01L 11/0002; G01L 19/144; G01L 27/00; G01L 5/0076; G01L 7/104; G01L 1/02; G01L 19/0015; G01L 19/145; G01L 5/0038; G01L 5/16; G01L 9/0079; G01L 1/24; G01L 19/0663; G01L 3/14; G01L 7/00; G01L 9/0002; G01L 9/16; G01L 1/162; G01L 1/2231; G01L 1/2293; G01L 13/06; G01L 5/0004; G01L 5/165; G01L 7/082; G01L 9/001; G01L 9/0022; G01L 9/0077; G01L 9/085; G01L 9/14; G01L 1/086; G01L 1/2262; G01L 2019/0053; G01L 21/34; G01L 23/18; G01L 5/162; G01L 5/22; G01L 9/0027; G01L 9/0033; G01L 9/0082; G01L 9/0089; G01L 9/10; G01L 1/246; G01L 11/00; G01L 11/008; G01L 11/025; G01L 21/00; G01L 21/02; G01L 23/125; G01L 23/22; G01L 5/009; G01L 5/161; G01L 5/1627; G01L 5/167; G01L 9/0004; G01L 9/0038; G01L 9/025; G01L 1/165; G01L 1/225; G01L 1/2268; G01L 13/028; G01L 19/08; G01L 19/10; G01L 21/22; G01L 21/30; G01L 21/32; G01L 23/32; G01L 25/006; G01L 5/0019; G01L 5/0052; G01L 7/043; G01L 7/084; G01L 1/04; G01L 1/127; G01L 1/2281; G01L 17/005; G01L 19/16; G01L 23/08; G01L 5/0047; G01L 5/0057; G01L 5/223; G01L 7/088; G01L 9/0064; G01L 9/0094; G01M 13/028; G01M 13/045; G01M 13/04; G01M 5/0008; G01M 3/26; G01M 15/08; G01M 3/16; G01M 3/3218; G01M 9/06; G01M 3/3263; G01M 5/0083; G01M 15/06; G01M 15/09; G01M 17/02; G01M 3/002; G01M 13/022; G01M 15/106; G01M 15/11; G01M 3/027; G01M 3/2807; G01M 3/3236; G01M 3/36

See application file for complete search history.

(56) References Cited

U.S. PATENT DOCUMENTS

| 2010/0033196 | A1 | 2/2010 | Hayakawa et al. | |
|---|---|---|---|---|
| 2012/0062245 | A1* | 3/2012 | Bao | G06F 3/0445 |
| | | | | 324/661 |
| 2014/0350348 | A1* | 11/2014 | Tee | A61B 5/205 |
| | | | | 600/300 |
| 2015/0114077 | A1 | 4/2015 | White et al. | |
| 2015/0292964 | A1* | 10/2015 | Sibbett | G06F 3/041 |
| | | | | 73/862.632 |
| 2016/0033343 | A1 | 2/2016 | Park et al. | |
| 2018/0243924 | A1 | 8/2018 | Visell et al. | |
| 2020/0141818 | A1 | 5/2020 | Bao et al. | |

FOREIGN PATENT DOCUMENTS

| CN | 114486005 | A | * | 5/2022 |
|---|---|---|---|---|
| WO | 2014068269 | A1 | | 5/2014 |

* cited by examiner

STRETCHABLE BIDIRECTIONAL CAPACITIVE PRESSURE SENSOR AND METHOD OF USE

The invention relates generally to a sensing device for measuring pressure. More particularly, the invention relates to a stretchable bidirectional capacitive pressure sensor having two elastomeric sheets with a series of embedded carbon nanotube electrodes separated by an elastomeric microstructure. Furthermore, the invention relates to a method of collecting data related to fluid flow over an object, and more particularly to a method of collecting data related to fluid flow over an object by using a stretchable two-dimensional pressure sensor.

BACKGROUND TO THE INVENTION

Flexible and/or stretchable pressure sensors are a recent development and are an area of great interest within research. These sensors are commonly 2-dimensional sensors which can measure a force acting over an area by taking readings over that area. The sensing mechanism used in flexible/stretchable sensors can vary, but they can be divided into piezoresistivity, capacitance and piezoelectricity, with capacitive sensing providing for high sensitivity, fast response and a wide dynamic range. The capacitive sensing mechanism works by the capacitance of the sensor being altered by a change in distance between the electrodes.

As described by Lipomi et al in "Skin-like pressure and strain sensors based on transparent elastic films of carbon nanotubes" Nature nanotechnology 6(12) p 788-792, stretchable sensors can be constructed from two electrode layers, embedded in an elastomeric material, separated by a separation layer constructed from a continuous flexible dielectric polymer. This construction allows for the measurement of a positive compressive force being applied to the electrode layers; however, it only provides low sensitivity and is unable to measure a negative compressive force being applied to the electrode layers. Recent developments shown by Mannsfeld et al in "Highly sensitive flexible pressure sensors with microstructured rubber dielectric layers" Nature Materials 9(10) p 859-864, have determined that sensitivity can be improved by the separation layer being constructed from microstructures instead of a continuous layer, particularly when the microstructures are pyramidal microstructures. However, this improvement in sensitivity is limited to detecting a positive compressive force as the pyramidal microstructures are attached to a single electrode layer.

The type of materials used for the electrodes have varied greatly from rigid conductors to electrolytic fluids. The use of these types of conductors have limited the field of application because of the potential for leaking and breaking. Majidi et al in US20120118066 A1 describe a pressure sensor with a plurality of liquid filled micro-channels being used in areas such as wearable technology.

Xu et al in "stretchable batteries with self-similar serpentine interconnects and integrated wireless recharging systems" Nature Communication 4 p 1543 describes a stretchable wireless changing system using various stretchable electronics, such as serpentine conductor lines and using thin films of carbon nanotubes forming supercapacitors.

Traditionally, the analysis and study of fluid flows is performed using computational methods or experimental methods. The use of a model within a wind tunnel is a common experimental method. By introducing pressure taps, or single point sensors, into an area of the model it is possible to measure pressure at those points, but it can be difficult to gain a more complete picture because of limitations on the number of pressure tap locations. Furthermore, because of the size of wind tunnels, or other experimental apparatuses, the models used are limited in size. Computational methods, such as computational fluid dynamics (CFD), have gone someway to addressing the limitations of the experimental methods. However, the accuracy of the computational method is limited by the complexity of the computational model and the available computational power. Both methods are also challenged by low Reynold number conditions, as it may be difficult to observe these conditions in the experimental method or it may be problematic to solve computationally.

A further problem with both computational and experimental methods is with the environment and the data collected from it. The environmental conditions in both methods can be idealised or controlled slightly, which lead to the collected data being at best partially relevant to the real world. Morozini et al in DE102016109531 A1 discuses the use of a smart textile to measure aerodynamic pressure. The disclosed smart textile is applied to a vehicle and used to make specific adjustments to sections of the vehicle. However, the smart textile once applied cannot be moved as the lacquer hardens the textile into the desired position.

It is an object of the present invention to reduce or substantially obviate the aforementioned problems.

STATEMENT OF INVENTION

According to the first aspect of the present invention, there is provided a stretchable bidirectional capacitive pressure sensor comprising: a first elastomeric sheet made from a dielectric material, with a series of conductor lines located on or in the elastomeric sheet; a second elastomeric sheet made from a dielectric material, with a series of conductor lines located on or in the elastomeric sheet; wherein the conductor lines of the first elastomeric sheet are substantially orthogonal to the conductor lines of the second elastomeric sheet; a microstructure comprising a plurality of elastomeric pillars made from a dielectric material; wherein the microstructure is bonded to the first and second elastomeric sheets so that the bidirectional sensor can register positive and negative pressure by the movement of the first and second elastomeric sheets. The microstructure is an array of spaced apart repeating structures used to separate two electrodes. By having a sensor with a microstructure that is bonded to both elastomeric sheets it is possible to ensure that there is high sensitivity on registering both positive and negative pressures. Because of the high sensitivity from this construction, low Reynold conditions are no longer a challenge.

The pillars in the microstructure can be bonded either directly or indirectly to the first and second elastomeric sheets. For example, the pillars of the microstructure are indirectly bonded to the elastomeric sheet if there is an intervening layer of material. When the elastomeric sheet is a laminate structure consisting of multiple layers, the pillars of the microstructure can be bonded directly to the elastomeric sheet. This allows the sensor to be constructed to meet any structural requirements while still maintaining the ability to register positive and negative pressures.

The series of conductor lines in each of the first and second elastomeric sheets may be formed from carbon nanotubes. This type of conductive material allows for the electrical properties of the conductor lines to be maintained when the sheets are stretched or deformed. The number of conductor lines in the series, as well as the type of conductor material, may be selected based on the required sensor specifications (resolution, sensitivity, or etc). For example, the number of conductor lines may be increased to improve the resolution of the sensor. The series of conductor lines may be in direct contact with the microstructure or have an intervening layer, such as the elastomeric sheet.

Each pillar may be located at a crossing point between the first elastomeric sheet's conductor lines and the second elastomeric sheet's conductor lines. The combination of a pillar and crossing point forms a pixel. The number of pixels determines the resolution of the sensor. Each pixel can provide a measurement, but the combination of pixels creates a sensing area over which pressure is measured.

The dielectric material within the bidirectional pressure sensor may be a polydimethylsiloxane (PDMS) polymer, or other suitable elastomeric material. This material is a stretchable dielectric polymer and may also be transparent, translucent or opaque. When the first elastomeric sheet, second elastomeric sheet and pillars are formed from this material it can provide a stretchable transparent sensor.

The stretchable bidirectional capacitive pressure sensor may comprise stretchable electrodes. Each of the elastomeric sheets may have a stretchable electrode connected to the series of conductor lines. The stretchable electrode may be located in or on its respective elastomeric sheet. Having a stretchable electrode connected to the conductor lines in the series of conductor lines allows for an electrical connection to each conductor line to be maintained despite the sensor being deformed. The stretchable electrodes may be formed from any suitable material such as copper. Each stretchable electrode may be a serpentine electrode. Serpentine electrodes can be stretched by up to 300% while maintaining their electrical properties.

The stretchable bidirectional capacitive pressure sensor may comprise an adhesive layer to allow attachment to an object. This adhesive layer may be an additional layer in a laminate structure or may be a layer applied to one of the elastomeric sheets. Different adhesives vary in strength and an adhesive may be selected to allow the stretchable bidirectional capacitive pressure sensor to be removed and reused.

The plurality of pillars may be substantially evenly spaced from one another allowing for more consistent readings to be taken. The dimensions of each pillar may be substantially similar. For example, each pillar may have a width of 6 µm and a height of less than 300 µm. The microstructure may be shaped and sized to provide an area over which pressure can be measured, a non-limiting example is that of a square 4 mm by 4 mm. Within the sensing area there are a number of pixels formed by the combination of each pillar and the associated conductor line crossing points. The number of pillars, size of each pillar, and the inter-pillar spacing may be selected based on the sensor specification (resolution, sensitivity, or etc) and desired sensing area, for example a larger number of smaller pillars may increase the resolution of the sensor while maintaining the required sensitivity to both positive and negative pressure.

The elastomeric sheet may comprise a laminate structure, for example it could include a first PDMS layer, a layer comprising a series of conductor lines, and a second PDMS layer. The lamination structure of an elastomeric sheet allows the sensor to be constructed to meet any structural requirements.

According to a second aspect of the present invention, there is provided a method of collecting data related to fluid flow over an object, comprising the steps of: attaching at least one stretchable two-dimensional capacitive pressure sensor to an area of the object; subjecting the object to a fluid flow; and, recording, from the stretchable two-dimensional pressure sensor, data indicative of pressure over the area of the object. The two-dimensional capacitive pressure sensor allows for multiple readings to be taken over its sensing area, unlike traditional pressure taps, or point sensors, which only provide a single reading within an area. The multiple readings from the stretchable two-dimensional capacitive pressure sensors provides for the detail similar to computational methods while also allowing for the accuracy of experimental methods. The method allows for the collection of data in real world conditions with actual real world objects, for example the method allows for a sensor to be attached to a vehicle being driven on public roads.

The two-dimensional capacitive pressure sensor may be a stretchable two-dimensional bidirectional capacitive pressure sensor. This allows for both positive and negative pressures to be measured. Preferably, the stretchable two-dimensional capacitive pressure sensor is that of the first aspect of the present invention.

The method of analysing fluid flow may further comprise the step of placing the object within an experimental apparatus, such as a wind tunnel or water tank. The use of the sensor within wind tunnels or water tanks allows for more measurements to be taken within an area and provides the accuracy of experimental data while providing detail similar to that of a computational method.

The object may be subjected to fluid flow in real-world conditions. An example of this is applying the stretchable two-dimensional pressure sensor to a vehicle, or part of a vehicle, then operating the vehicle outside of an experimental apparatus (wind tunnel etc) in real-world conditions. This allows for real world data to be collected instead of data within a controlled environment.

The method may use an array of sensors, in a similar or dissimilar location. The stretchable two-dimensional capacitive sensor may be within the array of sensors. The array may further comprise sensors to measure other parameters, such as temperature. The array of sensors and the further sensors may be stretchable sensors. The array may be similar to the stretchable bidirectional capacitive pressure sensor in which there are a plurality of microstructures between a first and second elastomeric sheet. The plurality of microstructures provides a sensing area in which pressure can be measured. This allows for a large amount of data to be collected while maintaining the advantages associated with the stretchable two-dimensional capacitive pressure sensor.

Stretchable two-dimensional capacitive pressure sensors, particularly those of the first aspect of the invention, are applicable to a variety of fields. For example, they can be used as a sensor for detecting touch or used as a form of electronic skin for a robotic device.

BRIEF DESCRIPTION OF THE DRAWINGS

For a better understanding of the present invention, and to show more clearly how it may be carried into effect, reference will now be made by way of example only to the accompanying drawings, in which:

FIGS. 5a, 5b and 5c together show a side view of a stretchable bidirectional capacitive pressure sensor with multiple microstructures being deformed as a result of external forces according to the first aspect of the present invention.

DESCRIPTION OF PREFERRED EMBODIMENTS

Figure 1:
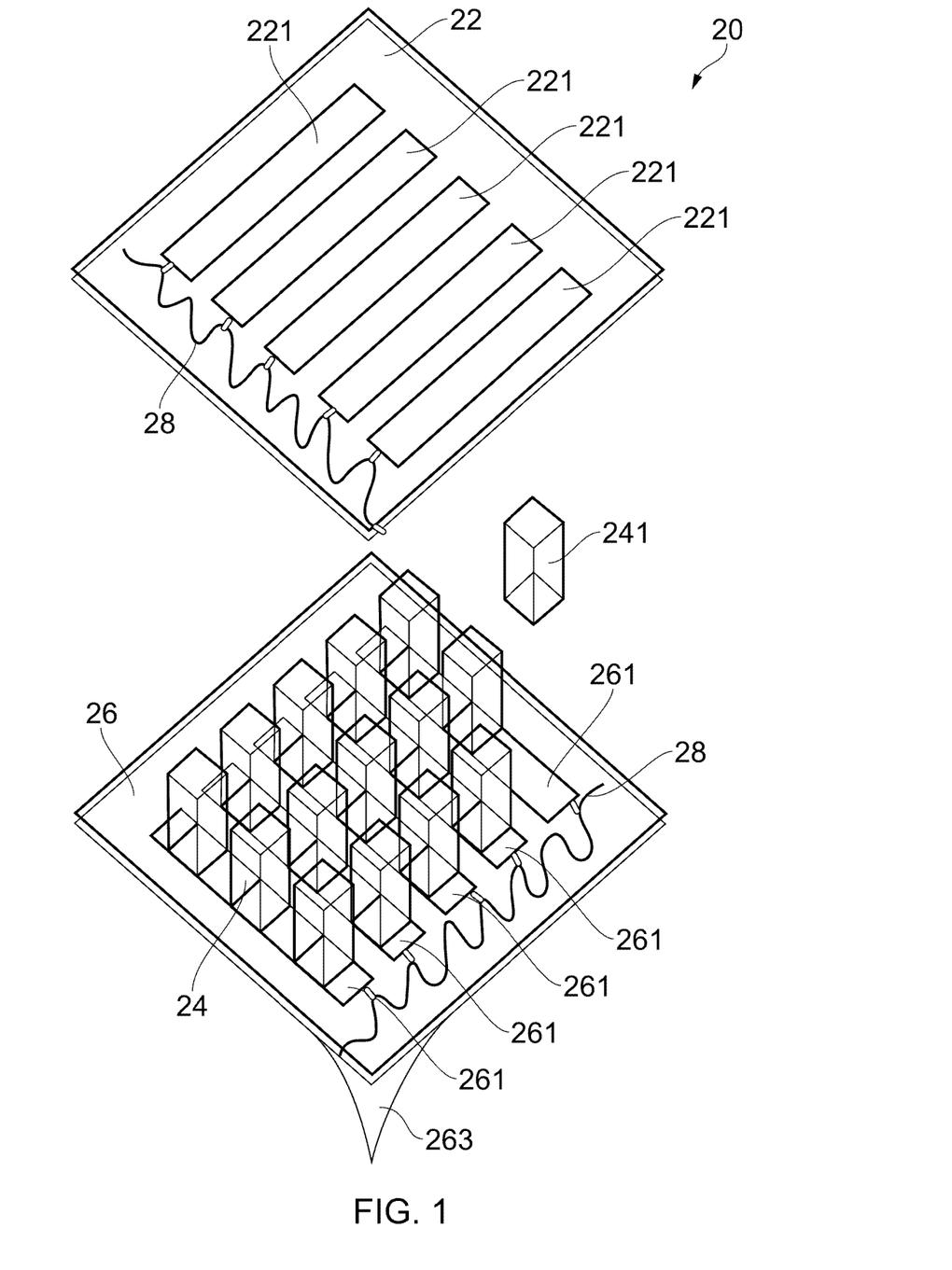
FIG. 1 shows an exploded schematic view of a first embodiment of a bidirectional pressure sensor according to the first aspect of the present invention.

FIG. 1 shows an exploded-view of an example embodiment of the first aspect of the invention. The stretchable bidirectional capacitive pressure sensor 20 comprises a first elastomeric sheet 22, a microstructure 24, and a second elastomeric sheet 26. The first elastomeric sheet 22 and second elastomeric sheet 26 are made from a dielectric material. A series of parallel running conductor lines 221 is located on or in the first elastomeric sheet 22. The microstructure 24 comprises a plurality of elastomeric pillars 241 made from a dielectric material. Each pillar in the present embodiment is a cuboid, preferably a rectangular cuboid with a width of approximately 6 µm and a height less than 300 µm. Although not apparent from the exploded view in FIG. 1, two opposite faces of the cuboid pillars are bonded, either indirectly or directly, to the first elastomeric sheet 22 and the second elastomeric sheet 26. A series of parallel running conductor lines 261 are located on or in the second elastomeric sheet 26. The series of conductor lines of the first elastomeric sheet 221 are orthogonal to the series of conductor lines of the second elastomeric sheet 261.

The conductor lines in FIG. 1 appear solid, the skilled person will recognise this is not indicative of the type of material used. In preferable embodiments the conductor lines are formed from carbon nanotubes, however any conductive material which is known to the skilled person as being flexible and deformable while maintaining its electrical properties would be suitable.

Each of the elastomeric sheets 22 & 26 are laminate structures with a PDMS laminate layer. The second elastomeric sheet 26 includes an adhesive layer which allows the sensor 20 to be attached to an object. Numeral 263 in the figure indicates a peel-off backing as is commonly used to protect adhesive layers until used. Both the first elastomeric sheet and the second elastomeric sheet are essentially identical in construction. Therefore, when the stretchable bidirectional capacitive pressure sensor 20 is constructed the elastomeric sheets may be orthogonally disposed.

Both elastomeric sheets include a stretchable electrode located on an edge, in the current embodiment this is a serpentine electrode 28 made from copper. Each serpentine electrode 28 is connected to the ends of all the conductor lines in the series on its respective sheet. Furthermore, the serpentine electrode of the first elastomeric sheet is perpendicular to the serpentine electrode of the second elastomeric sheet.

Figure 2:
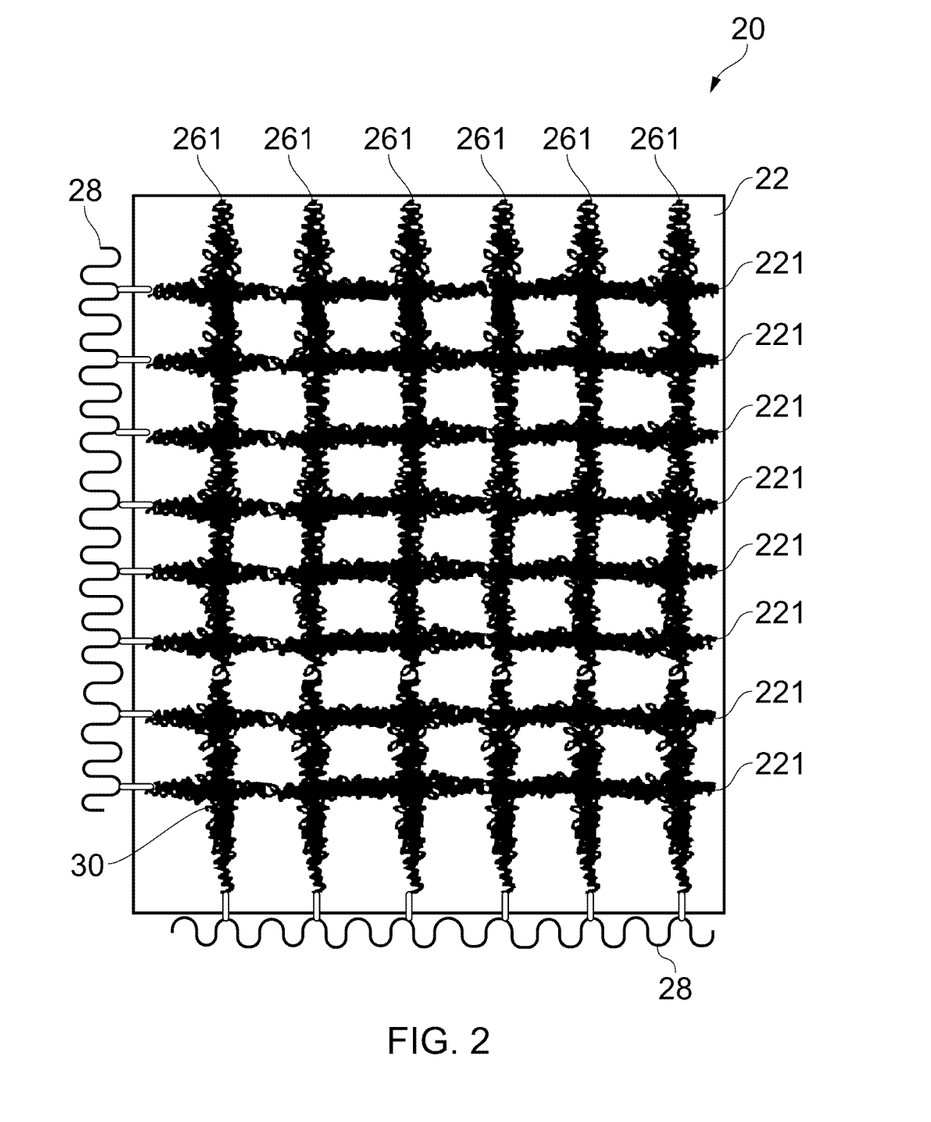
FIG. 2 shows a plan view of the bidirectional pressure sensor according to the first embodiment of the present invention.
Figure 3:
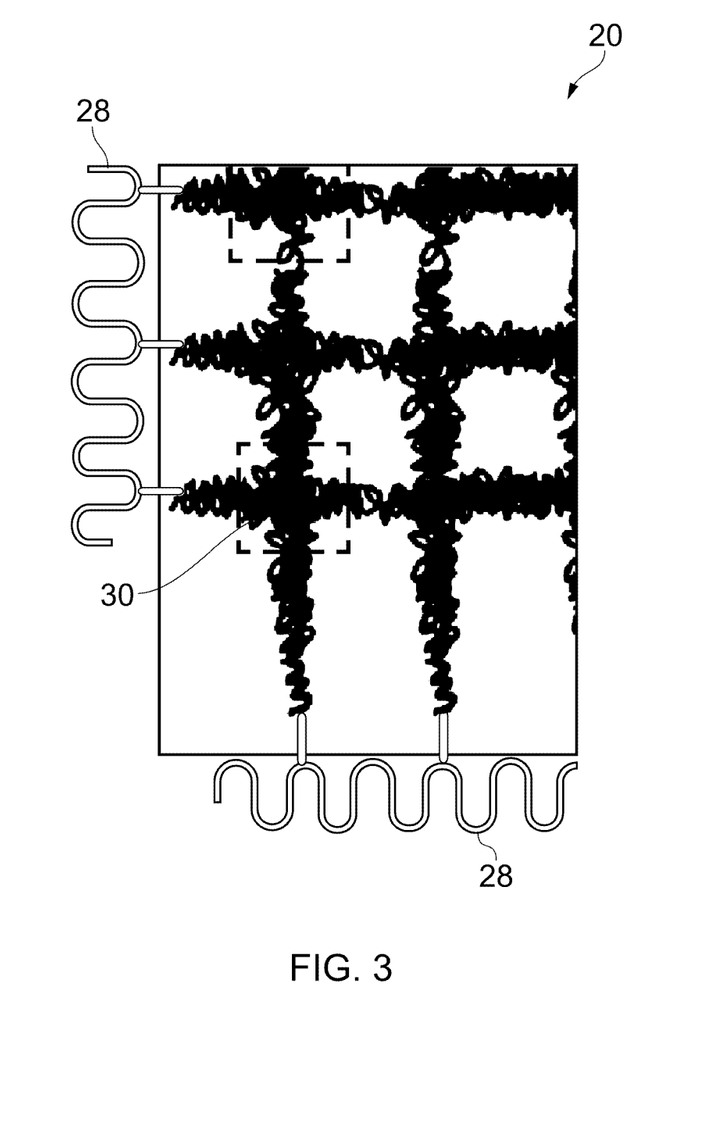
FIG. 3 shows a magnified view of the bidirectional pressure sensor in FIG. 2.

FIGS. 2 and 3 both show the stretchable bidirectional capacitive pressure sensor according to the first embodiment of the present invention when viewed from the top. In the present embodiment, the elastomeric sheets and pillars are translucent or transparent allowing for both series of conductor lines and serpentine electrodes to be seen. However, in other embodiments the elastomeric sheets may be opaque. The stretchable bidirectional capacitive pressure sensor 20 comprises a first elastomeric sheet 22 having a series of conductor lines 221, a microstructure, and a second elastomeric sheet having a series of conductor lines 261. Each elastomeric sheet comprises a series of conductor lines 221 and 261. The series of conductor lines in the first elastomeric sheet are orthogonal to the series of conductor lines in the second elastomeric sheet. This provides for crossing points 30, or apparent intersections, between the conductor lines. Although not visible in FIG. 2 or FIG. 3, the microstructure comprises a plurality of pillars bonded either directly or indirectly to the elastomeric sheets. Each pillar is located and bonded at a crossing point 30. The magnified view of the stretchable bidirectional pressure sensor provided in FIG. 3 shows in broken lines the approximate outline of two pillars located and bonded at crossing points. The serpentine electrodes 28 are connected to each conductor line in a series of conductor lines.

Figure 4:
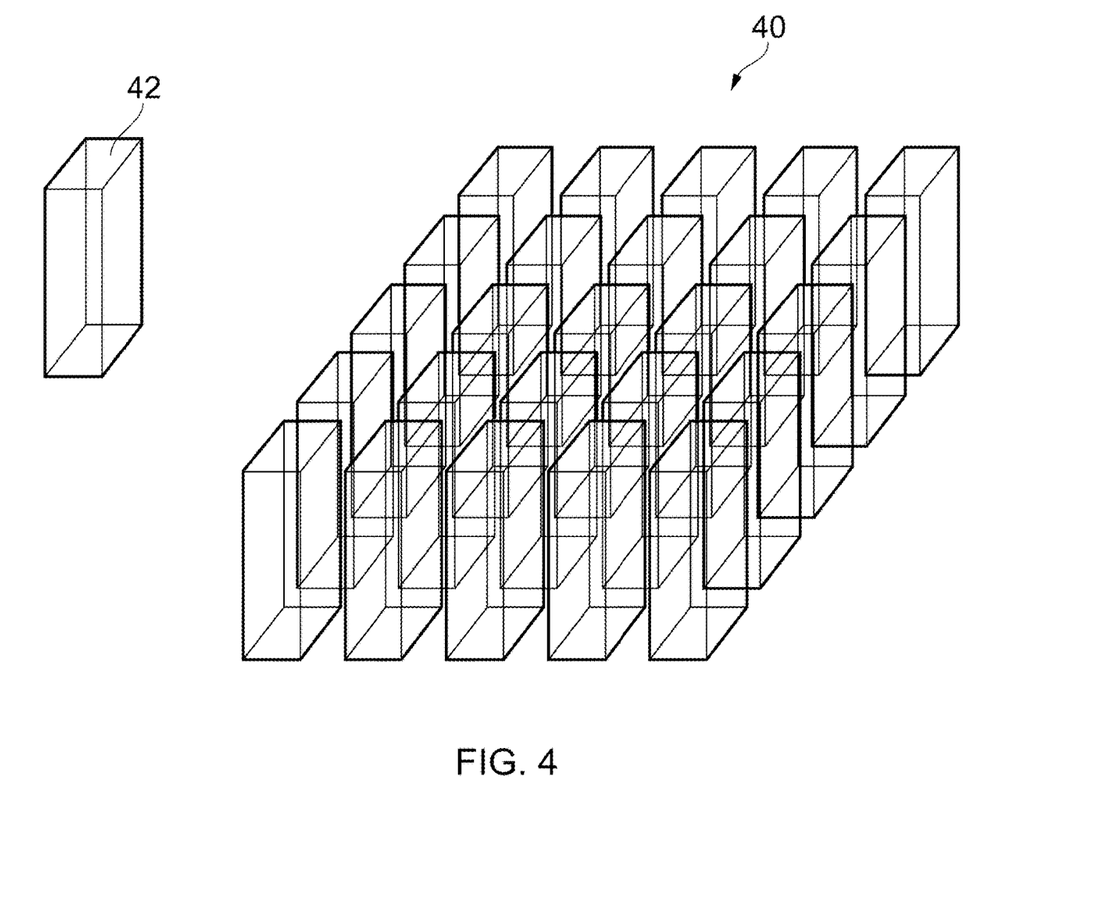
FIG. 4 shows an example of the microstructure of the sensor of FIG. 1.

FIG. 4 shows an example of the microstructure used in the first embodiment of the invention, it also shows an example of an elastomeric pillar used in the microstructure. The microstructure 40 is made from a dielectric elastomer and comprises a plurality of elastomeric pillars, such as pillar 42, which will be located at a crossing point between conductor lines and bonded to elastomeric sheets. The microstructure is an array of evenly spaced and identically sized pillars. Each individual pillar of the microstructure 40 has substantially similar, or identical, dimensions and the pillars are substantially evenly spaced from one another. The number of pillars, inter-pillar spacing, dimension and shape is selected based on the required sensor specification (resolution, sensitivity, or etc), for example a larger number of smaller pillars may increase the resolution of the sensor while maintaining the required sensitivity to both positive and negative pressure. The overall size and shape of the microstructure determines the effective detection area, or sensing area, of the sensor. In the current embodiment each pillar 42 has a plurality of faces with two opposite faces providing the surface for bonding to the elastomeric sheets.

Figure 5A:
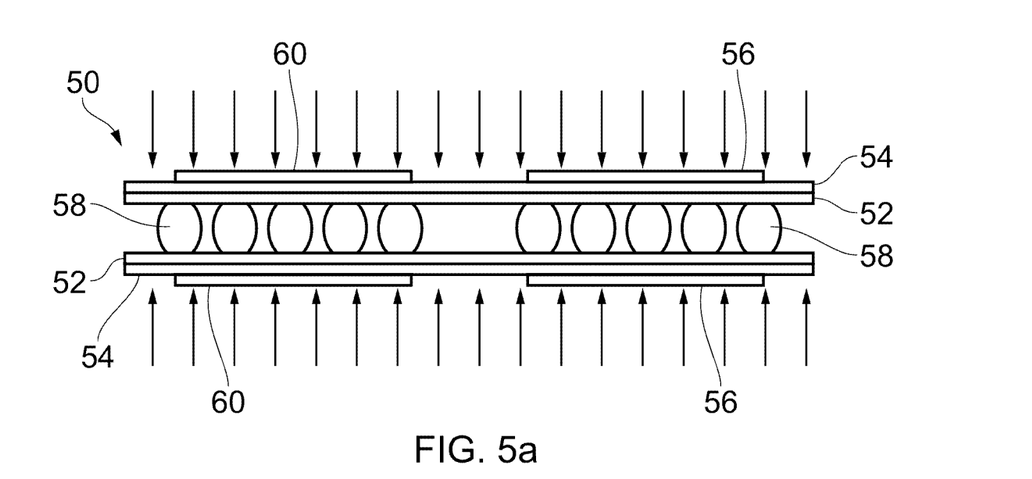
FIG. 5a shows the array of stretchable bidirectional capacitive pressure sensors under positive pressure.
Figure 5B:
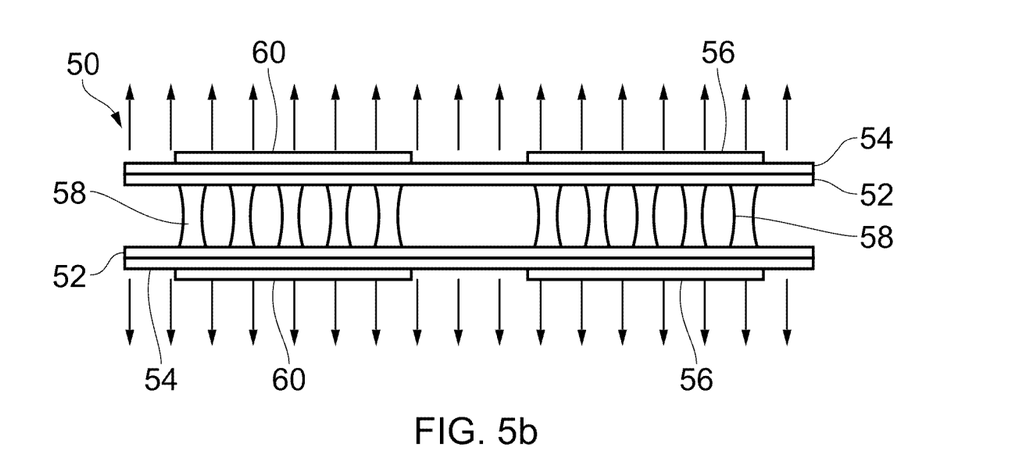
FIG. 5b shows the array of stretchable bidirectional capacitive pressure sensors under negative pressure.
Figure 5C:
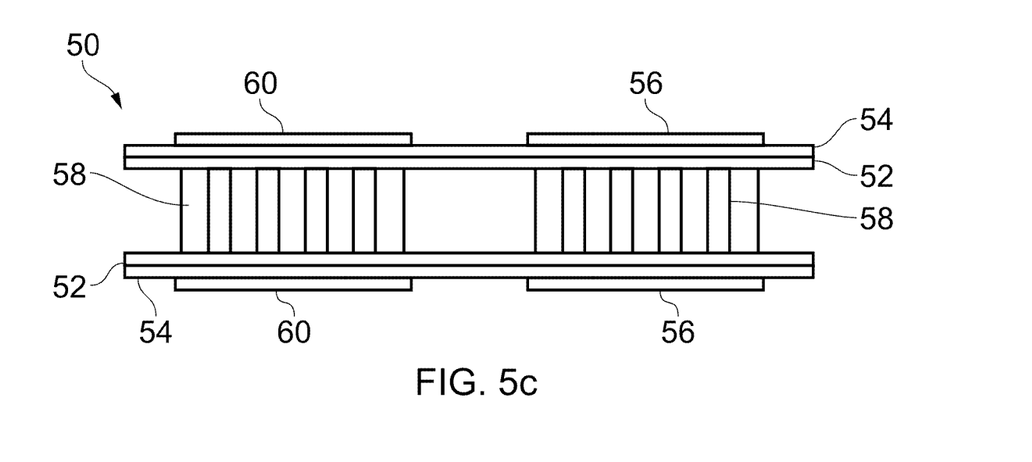
FIG. 5c shows the array of stretchable bidirectional capacitive pressure sensors under rest conditions.

FIGS. 5a, 5b & 5c together show a stretchable bidirectional capacitive pressure sensor having an array of sensing areas formed by a plurality of microstructures according to the first aspect of the present invention. In the current embodiment, the stretchable bidirectional capacitive pressure sensor comprises a first elastomeric sheet made from a dielectric material, a second elastomeric sheet made from a dielectric material and an array of elastomeric microstructures disposed between the elastomeric sheets. Each of the elastomeric sheets comprises a PDMS layer 52 and a further elastomeric layer 54 made of a dielectric material. The array of microstructures comprises at least two microstructures 58, each having a plurality of pillars bonded, directly or indirectly, to the elastomeric sheets. Each microstructure is disposed between an electrode set 56 & 60 formed on or in the first and second elastomeric sheets. Each electrode in the electrode set comprises a series of conductor lines which are orthogonal to the conductor lines in the opposing electrode in the same electrode set. As in the embodiment shown in FIGS. 1 to 3 and described above, each pillar is located and bonded at a crossing point formed between the orthogonal conductor lines in an electrode set. The combination of a pillar and crossing point forms a pixel. Each microstructure has a plurality of pillars and crossing points (pixels) which allow for multiple readings to be taken, forming a sensing area.

FIG. 5a shows the array 50 under a compressive force (shown by force arrows) acting on the first elastomeric sheet and second elastomeric sheet. The plurality of pillars within each microstructure 58 are deformed through compression which results in a decrease in distance between the electrode sets 56 & 60.

FIG. 5b shows a stretchable bidirectional capacitive pressure sensor 50 under an expansive force (shown by force arrows), such as a negative pressure, acting on both the first and second elastomeric sheets. The plurality of pillars in each microstructure are deformed through tension, resulting in an increase in the distance between each electrode set 56 & 60.

FIG. 5c shows a stretchable bidirectional capacitive pressure sensor 50 at rest with no external forces acting upon either the first elastomeric sheet or the second elastomeric sheet. Therefore, there is no deformation to the plurality of pillars.

The sensing mechanism for the stretchable bidirectional pressure sensor of the first aspect of the present invention and second aspect of the present invention use a capacitive sensing mechanism. At least one pillar of the microstructure is deformed by an external force applied to either the first elastomeric sheet and second elastomeric sheet. As discussed in relation to FIGS. 5a and 5b, the pillar can deform through compression or tension. This deformation causes a change in capacitance because the distance between the conductor lines change. The capacitance of each pillar and conductor line crossing point is calculated by equation 1.

$$C = \frac{\varepsilon_0 \varepsilon_r A}{L} \qquad [1]$$

Where the capacitance (C) is inversely proportional to the distance between the orthogonal conductor lines (L), and directly proportional to the area formed by conductor lines at the crossing point (A), relative permittivity of the dielectric material ($\varepsilon_r$) and the permittivity in a vacuum ($\varepsilon_0$). By calculating the change in capacitance, it is possible to calculate the location and intensity of the force.

Bidirectional pressure sensors according to embodiments of the first aspect of the present invention remain functional when substantially stretched because of the various materials used, such as the elastomers and stretchable conductors. Similarly, the pressure sensors used in embodiments of the second aspect of the present invention remain functional when substantially stretched because of the materials used.

The second aspect of the invention is provided by a stretchable two-dimensional capacitive pressure sensor, or an array of sensors, attached to an object allowing for the collection of data related to fluid flow over the object. The stretchable two-dimensional pressure sensor is a capacitive type of sensor. The stretchable sensor is attached, preferably by means of an adhesive, to an area of the object, for example a portion of its surface. Once the stretchable sensor has been attached to the object it is subjected to fluid flow and data indicative of the pressure of the object surface is recorded. This recorded data can be used immediately in analysing fluid flow, or stored for later use. The fluid flow over the stretchable capacitive pressure sensor, or array of sensors, creates an external force which acts on an elastomeric sheet. This elastomeric sheet deforms a dielectric material located between two electrodes. The deformation in the dielectric material changes the distance between the two electrodes which changes the capacitance.

Another embodiment of the second aspect of the present invention uses a stretchable bidirectional capacitive pressure sensor. This sensor comprises two elastomeric layers containing electrodes, with an electrode separation layer made from dielectric material. The electrode separation layer is bonded, either directly or indirectly, to both elastomeric layers. The bonding allows for an external force, such as a positive or negative pressure, to be translated into the separation layer undergoing compression or tension.

Another embodiment of the second aspect of the present invention uses a stretchable two-dimensional bidirectional capacitive pressure sensor described in the first aspect of the present invention.

The use of a stretchable pressure sensor, particularly one with multiple electrodes in each sensing layer, allows for measurements to be taken over an area. These measurements can be used to create a map of the forces. Unlike the traditional means of measuring pressure, such as pressure taps, the use of a stretchable pressure sensor allows for the pressure within an area to be measured. This provides results similar to that of computational methods, such as CFD, which can also calculate pressure within an area of the model.

The embodiments described above are provided by way of example only, and various changes and modifications will be apparent to persons skilled in the art without departing from the scope of the present invention as defined by the appended claims.

I claim:

1. A stretchable bidirectional capacitive pressure sensor comprising:
   a first elastomeric sheet made from a dielectric material, with a series of conductor lines located on or in the first elastomeric sheet;
   a second elastomeric sheet made from a dielectric material, with a series of conductor lines located on or in the second elastomeric sheet;
   wherein the conductor lines of the first elastomeric sheet are orthogonal to the conductor lines of the second elastomeric sheet; a microstructure comprising a plurality of elastomeric pillars made from a dielectric material, disposed between the elastomeric sheets;
   wherein the microstructure is bonded to both the first and second elastomeric sheets for enabling the bidirectional sensor to register positive and negative pressure by the movement of the first and second elastomeric sheets; and
   wherein each elastomeric pillar is located at a crossing point between a conductor line of the first elastomeric sheet and a conductor line of the second elastomeric sheet.

2. A stretchable bidirectional capacitive pressure sensor as defined in claim 1 wherein the series of conductor lines in each of the first and second elastomeric sheets are formed from carbon nanotuhes.

3. A stretchable bidirectional capacitive pressure sensor as defined in claim 1 wherein the elastomeric material of each of the first and second elastomeric sheets is a polydimethylsiloxane polymer.

4. A stretchable bidirectional capacitive pressure sensor as defined in claim 1 wherein the elastomeric material of the microstructure is polydimethylsiloxane polymer.

5. A stretchable bidirectional capacitive pressure sensor as defined in claim 1 wherein each of the elastomeric sheets have a stretchable electrode connected to the series of conductor lines and located on or in the elastomeric sheet.

6. A stretchable bidirectional capacitive pressure sensor as defined in claim 5 wherein each stretchable electrode is a serpentine electrode.

7. A stretchable bidirectional capacitive pressure sensor as defined in claim 6 wherein the stretchable electrodes are copper electrodes.

8. A stretchable bidirectional capacitive pressure sensor as defined in claim 1 wherein at least one of the elastomeric sheets comprises an adhesive layer to allow attachment to an object.

9. A stretchable bidirectional capacitive pressure sensor as defined in claim 1 wherein the plurality of pillars are evenly spaced within an area.

10. A stretchable bidirectional capacitive pressure sensor as defined in claim 9 wherein the area is a square.

11. A stretchable bidirectional capacitive pressure sensor as defined in claim 10 where the square is 4 mm by 4 mm.

12. A stretchable bidirectional capacitive pressure sensor as defined in claim 1 wherein dimensions of each pillar in the plurality of pillars are similar.

13. A stretchable bidirectional capacitive pressure sensor as defined in claim 1 wherein the elastomeric sheets comprises a laminate structure.

14. A method of collecting data related to fluid flow over an object, comprising the steps of:
attaching at least one stretchable two-dimensional capacitive pressure sensor to an area of the object, the or each stretchable two-dimensional capacitive pressure sensor comprising a first elastomeric sheet made from a dielectric material, with a series of conductor lines located on or in the first elastomeric sheet, a second elastomeric sheet made from a dielectric material, with a series of conductor lines located on or in the second elastomeric sheet, wherein the conductor lines of the first elastomeric sheet are orthogonal to the conductor lines of the second elastomeric sheet, a microstructure comprising a plurality of elastomeric pillars made from a dielectric material, the microstructure being disposed between and bonded to both the elastomeric sheets, for enabling the bidirectional sensor to register positive and negative pressure by the movement of the first and second elastomeric sheets, and wherein each elastomeric pillar is located at a crossing point between a conductor line of the first elastomeric sheet and a conductor line of the second elastomeric sheet;
subjecting the object to a fluid flow; a recording, from the stretchable two-dimensional capacitive pressure sensor, data indicative of pressure over the area of the object.

15. A method of analysing fluid flow over an object as defined in claim 14 wherein the stretchable two-dimensional capacitive pressure sensor is a stretchable two-dimensional bidirectional capacitive pressure sensor.

16. A method of analysing fluid flow over an object as defined in claim 14 wherein the stretchable two-dimensional capacitive pressure sensor is a stretchable two-dimensional bidirectional capacitive pressure sensor that comprises a first elastomeric sheet made from a dielectric material, with a series of conductor lines located on or in the first elastomeric sheet;
a second elastomeric sheet made from a dielectric material, with a series of conductor lines located on or in the second elastomeric sheet;
wherein the conductor lines of the first elastomeric sheet are orthogonal to the conductor lines of the second elastomeric sheet; a microstructure comprising a plurality of elastomeric pillars made from a dielectric material, disposed between the elastomeric sheets;
wherein the microstructure is bonded to both the first and second elastomeric sheets for enabling the bidirectional sensor to register positive and negative pressure by the movement of the first and second elastomeric sheets.

17. A method of analysing fluid flow as defined in claim 14 further comprising the step of placing the object within a wind tunnel or a water tank.

18. A method of analysing fluid flow as defined in claim 14 wherein the at least one stretchable two-dimensional capacitive pressure sensor is within fin array of sensors.

\* \* \* \* \*